(12) United States Patent
Klossek et al.

(10) Patent No.: US 12,097,764 B2
(45) Date of Patent: *Sep. 24, 2024

(54) OPERATING MEMBER WITH MOVABLY MOUNTED ACTUATING PART AND IMPROVED GUIDANCE MECHANISM FOR THE PARALLEL GUIDANCE OF THE ACTUATING PART

(71) Applicant: Preh GmbH, Bad Neustadt a.d. Saale (DE)

(72) Inventors: Arthur Klossek, Bad Neustadt a.d. Saale (DE); Thomas Ofenhitzer, Salz (DE); Thilo Schultheis, Bad Neustadt a.d. Saale (DE); Andreas Hofmann, Würzburg (DE)

(73) Assignee: Preh GmbH, Bad Neustadt a.d. Saale (DE)

( * ) Notice: Subject to any disclaimer, the term of this patent is extended or adjusted under 35 U.S.C. 154(b) by 15 days.

This patent is subject to a terminal disclaimer.

(21) Appl. No.: 17/932,542

(22) Filed: Sep. 15, 2022

(65) Prior Publication Data

US 2023/0079883 A1  Mar. 16, 2023

(30) Foreign Application Priority Data

Sep. 15, 2021  (DE) .......................... 102021123892.7

(51) Int. Cl.
  *B60K 35/10*  (2024.01)
  *B60K 35/00*  (2024.01)
  *G06F 3/0488*  (2022.01)
(52) U.S. Cl.
  CPC ............ *B60K 35/00* (2013.01); *G06F 3/0488* (2013.01); *B60K 35/10* (2024.01); *B60K 2360/131* (2024.01); *B60K 2360/1438* (2024.01)

(58) Field of Classification Search
  CPC .............................. B60K 35/00; B60K 35/10; B60K 2360/1438; B60K 2360/131; G06F 3/0488
  (Continued)

(56) References Cited

FOREIGN PATENT DOCUMENTS

| DE | 4316998 A1 | 11/1994 |
|---|---|---|
| DE | 102020125709 A1 | 4/2022 |
| DE | 102021105195 | 6/2022 |

OTHER PUBLICATIONS

Applicant's Arguments/Remarks Made in an Amendment for U.S. Appl. No. 17/651,490, Aug. 31, 2023 (Year: 2023).*

(Continued)

*Primary Examiner* — T. Scott Fix
(74) *Attorney, Agent, or Firm* — M&B IP Analysts, LLC

(57) ABSTRACT

An operating member including a support; an actuating part mounted on the support by a mount, to be movable relative to the support, by manual actuation against a resetting force to carry out an actuating movement from a rest position into a depressed position; and a detector, having at least one force sensor, adapted to detect at least one position of the actuating part is presented. The mount includes a guidance mechanism having at least one pair of coupled levers, wherein the levers are each pivotably mounted on the support by a first pivot joint defining at least one first pivot axis and on the actuating part by a second pivot joint defining at least one second pivot axis to cause a pivoting movement of the levers by the actuating movement. The guidance mechanism further includes at least one coupling rod to couple the pivoting movement of the levers.

27 Claims, 3 Drawing Sheets

(58) Field of Classification Search
USPC .......................................................... 74/469
See application file for complete search history.

(56) References Cited

OTHER PUBLICATIONS

Notice of Allowance for U.S. Appl. No. 17/651,490, Sep. 12, 2023 (Year: 2023).*
The German Office Action—Notice of Revocation for German Application No. 102021123892.7, German Patent and Trademark Office, Munchen, Germany, dated: May 16, 2022.

* cited by examiner

OPERATING MEMBER WITH MOVABLY MOUNTED ACTUATING PART AND IMPROVED GUIDANCE MECHANISM FOR THE PARALLEL GUIDANCE OF THE ACTUATING PART

The present disclosure relates to an operating member with an actuating part having an actuating surface for an operator to perform an operating input. The actuating part is mounted on a support so as to be displaceable along an actuation direction, which is perpendicular to the actuating surface, for example. Particularly in the case of operating members whose actuating surface has a maximum dimension that is many times larger compared with a maximum stroke distance, herein after referred to in short only as stroke distance, additional means are generally required in order to ensure a so-called parallel guidance of the actuating part. This is understood to mean that the actuating part undergoes, at least as intended, a substantially translational displacement during actuation and that thus, the actuating surface is, for example, displaced while maintaining its orientation in space if possible. It is known to stabilize in the aforementioned sense the movement of actuating parts with comparatively extensive actuating surfaces by means of mechanisms comprising multiple-joint scissor mechanisms or wire rods. Due to the necessary multi-part construction, these designs exhibit play particularly in the joint designs used, which results in the fact that a certain "lost motion" cannot be avoided at least in the parallel guidance. This mars haptic perception when actuating the actuating part and is problematic particularly if the stroke distance is comparatively small anyway.

Against this background, there was a demand for a solution for an operating member with a movably mounted actuating part and an improved guidance mechanism for the parallel guidance of the actuating part, wherein the guidance mechanism is improved in a play-reducing manner and, in particular, on the one hand, a lateral compensatory movement of the actuating part is minimized, which is perceived as disadvantageous with regard to the haptics, thus avoiding an overload on the play-preventing joints. This object is achieved with an operating member according to claim 1. An equally advantageous use is the subject matter of the independent claim. Advantageous embodiments are in each case the subject matter of the dependent claims. It must be noted that the features cited individually in the claims can be combined with each other in any technologically meaningful manner and represent other embodiments of the present disclosure. The description, in particular in connection with the figures, additionally characterizes and specifies the present disclosure.

The present disclosure relates to an operating member. The term "operating member" is to be interpreted broadly and serves for performing an operating input by means of a movable actuating part within the context of a man-machine interface.

The operating member according to the present disclosure comprises a support. The term "support" is to be interpreted broadly and may have a single-part or multi-part configuration. For example, the support is a component which is a part of a supporting structure or is indirectly or directly fixed, for example, to a motor vehicle component. For example, the support is configured as a housing. For example, the support is formed from a plastic, a metal or a metallic alloy, such as ZAMAK, or combinations thereof.

According to the present disclosure, an actuating part is also provided, which has an actuating surface generally facing towards the operator, for an operator to carry out an operating input. An actuating operating input is understood to be an actuation, particularly with a simultaneous contact, by an operator, which goes beyond a contact, during which the operator applies an actuating force acting perpendicularly on the actuating surface, in order to cause a partial or complete displacement of the actuating part, which follows the actuating force, from a rest position into a depressed position against a resetting force. In this case, a depressed position is understood to be the maximum possible final position of the actuating part, wherein the maximum stroke distance of the actuating part, which results from the displacement from the rest position into the depressed position, is hereinafter only referred to, in short, as a stroke distance.

According to the present disclosure, detection means for detecting at least one position, such as the depressed position, of the actuating part are also provided. For example, an electronic switching or functional state of a vehicle component is changed upon the depressed position being reached or detected. For example, the detection means comprise a force sensor disposed and/or acting between the support and the actuating part, in order to detect a displacement of the actuating part, e.g. in the direction perpendicular to the actuating surface. The term "force sensor" is to be interpreted broadly: According to a simple configuration, it is an electromechanical switch that changes its switching state depending on the position of the actuating part. In one configuration, it is a contactlessly detecting force sensor, such as a force sensor that capacitively, optically and/or inductively detects the actuating force. In another configuration, the force sensor is designed to detect the actuating force based on a mechanical influence acting on a component of the force sensor, such as a resistively or piezoelectrically detecting force sensor. Preferably, the force sensor is configured for detecting, for instance capacitively, the relative displacement between the actuating part and the support, by a determination of a change in measuring capacitance between an electrode fixed to the actuating part and an electrode fixed to the support. Most frequently, such force sensors permit a continuous position detection.

According to the present disclosure, mounting means are provided in order to enable the above-described movability of the actuating part relative to the support. According to the present disclosure, these mounting means comprise a guidance mechanism for the parallel guidance of the actuating part. A parallel guidance is understood to mean that the actuating part undergoes a substantially translational displacement during actuation and that thus, the actuating surface is, for example, displaced while maintaining its orientation in space if possible. The phrase "substantially" is also supposed to encompass such displacements that do not take place in a strictly translational manner, wherein, however, such a displacement is intended.

The guidance mechanism comprises at least one pair of coupled levers, which are each, on the one hand, mounted on the support so as to be pivotable about at least one associated first pivot axis and, on the other hand, mounted on the actuating part so as to be pivotable about at least one associated second pivot axis, in order to cause in each case a pivoting movement of the levers by means of the actuating movement. In this case, the first pivot axis is defined by a first pivot joint, while the second pivot axis is defined by a second pivot joint. According to the present disclosure, the guidance mechanism further includes a coupling rod in order to couple the pivoting movement of the levers of the pair, wherein the coupling rod is fixed at its outer ends in each case to one lever of the pair in an articulated manner, in each case by means of a first flexure joint, while defining a joint axis in each case. A coupling rod is understood to be a connection between the levers of the pair that can be subjected to tensile and compressive loads and that serves for transmitting the rotary movement in both directions and, in each case, from one lever to the respective other lever. The coupling rod may extend in a substantially straight line between the first flexure joints, but may extend in an angled manner between the first flexure joints in order to save construction space.

According to the present disclosure, the levers of the pair of the guidance mechanism are configured for moving synchronously about the first pivot axis when carrying out the actuating movement from the rest position into the depressed position, whereby the pivoting extent of each lever of the pair about the first pivot axis is thus substantially the same in any position between the rest position and the depressed position. According to the present disclosure, the pivoting extent of each lever of the pair about the first pivot axis is no greater than 10°, preferably no greater than 5°. Due to the limited pivoting extent, on the one hand, the buckling load of the first flexure joint about its joint axis is minimized, but also the load perpendicular with respect to the actuating direction, and thus the lateral displacement of the actuating part, which is hereinafter also referred to as horizontal, is minimized.

The flexure joint is not a "proper" joint in the sense of a kinematic pair, but is based on the principle of elastostatics (elasticity). The function of a joint is obtained by means of a region of a component with a reduced bending stiffness compared with the rigid adjacent regions of the component in order to enable bending about an imaginary pivot axis. Here, this region of reduced bending stiffness is provided in the transitional region between the lever and the coupling rod or the support or actuating part. For example, the reduced bending stiffness is produced by a local reduction of the cross section and is therefore also known as a "film hinge". A flexure joint is comparable to a conventional rotary joint having a limited rotating range, but has the advantage that it has no play and, at the same time, a resetting action. The position and orientation of the associated joint axis is defined, for instance, by the location and the distribution in space of the lowest bending stiffness in the region of the respective pivot joint. For example, the flexure joint is in each case the result of a weakening of the material provided in the transitional region between the respective lever and the associated coupling rod or the support or the actuating part. For example, it is, with respect to the cross section of the coupling rod, a constricted portion. Due to its location, the weakened-material portion provides for a locally pronounced elastic compliance and thus flexibility in the transitional region defining the flexure joint.

In one embodiment, the first and second pivot joints are both configured as journal bearings, axle bearings or shaft bearings. However, it is preferably provided that, in addition to the articulated connection between the coupling rod and the levers of the pair, which is configured as a flexure joint, at least one of the pivot joints of each lever of the pair including the first and second pivot joints is configured as a further, second flexure joint per lever. Thus, mechanical play of the mechanical parallel guidance is minimized yet again compared to conventional solutions. "Lost motion" is avoided several times over. Most preferably, for each lever of the pair, only the first pivot joint is configured as a second flexure joint, whereas the second pivot joint of each lever, for example, is configured as a rotary joint, such as a pivot hinge or swivel joint.

Preferably, it is provided that the mounting means have a component which is fixed to the actuating part or support and which is integrally connected to the respective lever in each case via the first or second pivot joint configured as the second flexure joint.

Preferably, the mounting means are wholly or partially made from a thermoplastic material, such as polyethylene (PE), polycarbonate (PC), polystyrene (PS), polyvinyl chloride (PVC), polyamide (PA), acrylonitrile butadiene styrene (ABS) or polymethyl methacrylate (PMMA), such as at least the levers, the coupling rod and the component associated with the actuating part or the support.

Preferably, the mounting means include a molded part, which is manufactured in a thermal molding process, and which, more preferably, forms at least the at least one pair of levers and the associated coupling rod including the associated flexure joints and, if necessary, the component provided for fixation to the support or actuating part. For example, the molded part is manufactured in an injection-molding step by means of a molding tool.

Preferably, it is provided that the relative distance between the first pivot axis and the second pivot axis of each lever of the pair is no more than 1.5 cm, e.g. 0.5 cm, in order to minimize the lateral displacement of the actuating part during the actuating movement from the rest position into the depressed position and vice versa.

According to a preferred embodiment, in order to save construction space and to minimize the displacement of the actuating part during the movement from the rest position into the depressed position, the first pivot axis and the second pivot axis of each lever of the pair, in the rest position or in the depressed position or in an intermediate position, preferably in the rest position, are arranged either all in a common plane or in parallel planes. The latter part means that the first and second pivot axes of the one lever of the pair lie within a first plane and the first and second pivot axes of the other lever of the same pair lie within a second plane parallel to the first plane.

Furthermore, resetting means for resetting the actuating part into the rest position are provided, for instance. For example, the resetting means comprise at least one spring which acts in a resetting manner between the support and the actuating part. It should not be excluded that the resetting force is supported by the elastic deformation of all flexure joints, that is, among other things, by the coupling rod pivoting relative to the respective lever. Preferably, the first flexure joint and/or the second flexure joint of each lever of the pair are configured to generate the resetting force causing the reset into the rest position by elastic deformation. Preferably, the first flexure joint of each lever of the pair is not elastically biased at least in the rest position, in order thus to minimize the danger of a mechanical overload on the first flexure joint.

In order to subject the coupling rod and the associated first flexure joints substantially, if possible, only to compressive and tensile loads in the rest position, it is provided, according to a preferred embodiment, that in the rest position, a shortest connecting line connecting the joint axes, which are defined by the first flexure joint, of the levers of a pair in each case orthogonally intersects the plane spanned by the first pivot axis and the joint axis of the one lever of the pair and the plane spanned by the first pivot axis and the joint axis of the other lever of the same pair.

In one embodiment, the levers of a pair are coupled to each other, by means of the coupling rod, in such a way that their directions of rotation of the pivoting movement about the first pivot axis are in each case equidirectional or directed in the same direction. Preferably, however, the directions of rotation of the pivoting movement of the levers of a pair are opposite. If one lever of the two levers of the pair rotates about its first pivot axis in a clockwise direction, for example, when the actuating part is actuated or the actuating part is reset, the respectively remaining lever of the pair rotates about its first pivot axis in the counterclockwise direction. Thus, the construction space taken up by the guidance mechanism can be reduced. In particular, this results in the possibility of disposing the second pivot axes defining the bearing arrangement of the actuating part, in each case with respect to the first pivot axis, further towards the outside in the direction perpendicular to the actuating direction for each lever, which improves the stabilization of the parallel guidance of the actuating part and minimizes or suppresses a tilting movement of the actuating part.

Particularly in the case of the embodiment dispensing with the second flexure joint, one pivot joint of the first pivot joint or the second pivot joint is provided with play in the direction perpendicular to the actuation direction between the joint partners. Due to the flexibility of the second flexure joints used as first or second pivot joints, however, a horizontal play in the remaining joints, which are not configured as a flexure joint but as a rotary joint, i.e. play that is orthogonal to the actuation direction, can be dispensed with because the flexure joints are capable, due to their greater flexibility, of enabling compensatory movements in order to avoid a jamming of the actuating part caused by possible tolerance deviations.

Preferably, the first and second pivot axes and the joint axis of each lever respectively form an angled lever. For example, the axes are disposed so as to extend parallel to each other, and their connecting lines in a plane orthogonal to the axes in each case include an acute angle.

Preferably, each lever of the pair is configured to be identical at least with respect to the dimension of the relative spacing of the second pivot axis from the first pivot axis and the associated joint axis from the first pivot axis.

Preferably, the guidance mechanism has, in addition to a first pair, a second pair of levers coupled by means of a coupling rod. For example, viewed from the operator, the first pair with an associated coupling rod is disposed underneath the actuating part in the region of the long side of the actuating surface, and the second pair with the associated coupling rod, viewed from the operator, is also disposed underneath the actuating part in the region of the opposite long side of the actuating surface.

According to a preferred configuration, and for synchronous coupling of the pairs, at least one lever of the first pair is non-rotatably connected to a lever of the second pair, and/or the coupling rod of the first pair is non-rotatably connected to the coupling rod of the second pair. For example, this is accomplished with a bar 12 of FIG. 1 that non-rotatably connects the respective levers or coupling rods.

Preferably, the actuating part has a stroke distance of less than 0.5 cm, preferably less than 0.3 cm, the stroke distance being defined by the actuating movement from the rest position into the depressed position.

Preferably, the actuating surface has an extent corresponding to at least ten times the stroke distance.

Preferably, the actuating part has a touchpad and/or a touchscreen. For example, the touchpad or touchscreen is used for spatially resolved touch detection.

In one configuration of the operating member according to the present disclosure, an actuator is further provided for exciting the vibration and/or movement of the actuating part, and thus for generating an active haptic feedback, which actuator is disposed between the support and the actuating part. The actuator is an active actuator, i.e. an actuator which can be triggered by a control signal provided by an electronic control system, and which, due to the application of a pulse, such as an impact, or the application of vibration to the adjacently disposed component, i.e. the actuating part, is capable of exciting movement or vibration in the latter, which is haptically perceptible by the operator via the finger resting on the actuating surface. For example, this haptic perception serves as a confirmation signal for an executed touch or actuation, or as a haptic acknowledgement of an evaluating unit performing the assignment of a switching or controlling function. Preferably, the actuator is an inertia-based, motor-based actuator, such as a motor on whose rotating drive shaft a mass is mounted eccentrically with respect to its center of gravity, or a magnetic coil actuator, or a piezoelectric actuator, or a linear wide-band actuator, such as a voice coil actuator or a linear resonance actuator. Preferably, the actuator is exclusively fixed to the actuating part in a positive manner or by substance-to-substance connection, e.g. by screwing or gluing. An electromagnetic actuator that acts in an attracting or repelling manner between the support and the actuating part may also be provided.

Furthermore, present disclosure relates to the use of the operating member in one of the above described embodiments in a motor vehicle.

The various embodiments are explained further with reference to the following Figures. The Figures are to be understood only as examples and each merely represent a preferred embodiment. In the Figures:

FIG. 1 shows an embodiment of the operating member 1 according to the embodiment. It serves for performing an operating input by means of a movable actuating part 2 within the context of a man-machine interface.

The operating member 1 according to the disclosed embodiments comprises a support 3. The term "support" denotes a component which is a part of a supporting structure or is indirectly or directly fixed, for example, to a motor vehicle component, such as a motor vehicle steering wheel. For example, the support 3 is formed from a plastic, a metal or a metallic alloy, such as ZAMAK, or combinations thereof.

Figure 1:
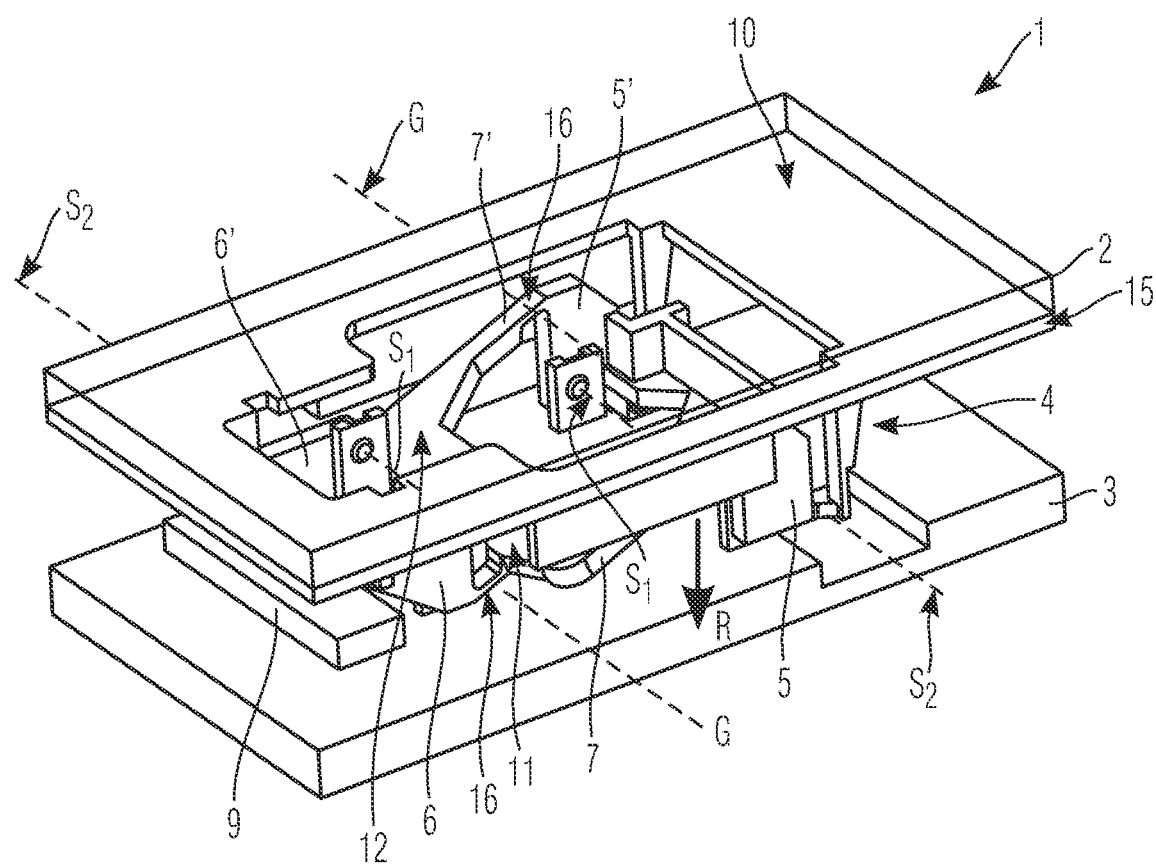
FIG. 1 shows a perspective view of an embodiment of the operating member 1 according to the embodiment.

Further, an actuating part 2 is provided, which has an actuating surface 10 facing towards the operator B, for the operator B to carry out an operating input. An actuating operating input is understood to be an actuation, particularly with a simultaneous contact, by the operator B, which goes beyond a contact, during which the operator B applies an actuating force acting perpendicularly on the actuating surface 10, in order to cause a displacement of the actuating part 2, which follows the actuating force, against a resetting force. In this case, a depressed position is understood to be the maximum possible final position of the actuating part 2, wherein the maximum stroke distance of the actuating part 2, which results from the displacement from the rest position shown in FIG. 1 into the depressed position, is referred as a stroke distance and is less than 0.3 cm.

Detection means 9 for detecting at least one position, such as the depressed position, of the actuating part 2 are also provided. Here, this is a capacitive force sensor. The latter is configured for capacitively detecting the relative displacement between the actuating 2 part and the support 3, by a determination of a change in measuring capacitance between an electrode fixed to the actuating part 2 and an electrode fixed to the support 3.

Further, mounting means 11 are provided in order to enable the above-described movability of the actuating part 2 relative to the support 3. According to the disclosed embodiments, these mounting means 11 comprise a guidance mechanism 4 for the parallel guidance of the actuating part 3. A parallel guidance is understood to mean that the actuating part 2 undergoes a substantially translational displacement during actuation and that thus, the actuating surface 10 is, for example, displaced along the actuation direction R while maintaining its orientation in space if possible. In this case, due to a pivoting movement of the guidance mechanism contributing to the parallel guidance, a displacement of the actuating part 2 in the direction parallel to the actuating surface 10, which is herein referred to as horizontal, is not completely excluded, but, just like a tilting of the actuating part 2, is supposed to be minimized or even avoided by the solution according to the disclosed embodiments.

Figure 2:
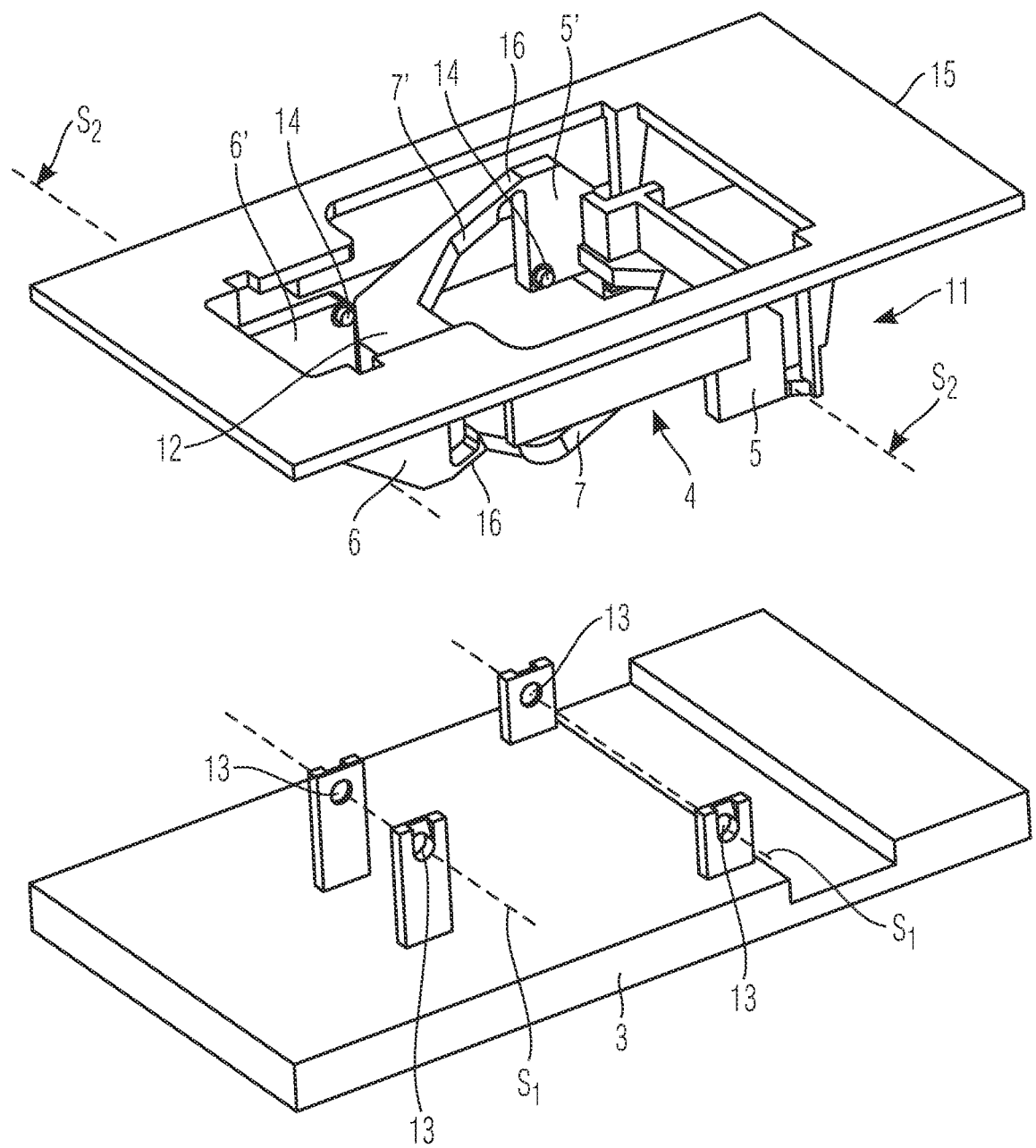
FIG. 2 shows a perspective exploded view of the embodiment shown in FIG. 1 without the actuating part.
Figure 3:
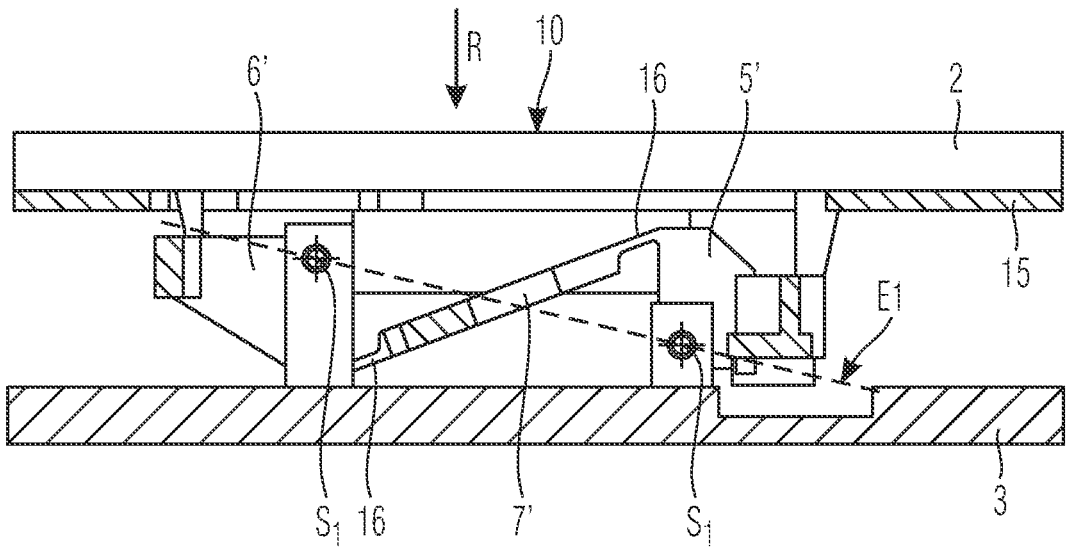
FIG. 3 shows a vertical section through the embodiment shown in FIG. 1.

The guidance mechanism 4 comprises two pairs of coupled levers 5, 6 or 5', 6', wherein the levers 5, 6; 5', 6' are each, on the one hand, mounted on the support 3 and, on the other hand, on the actuating part 2 so as to be pivotable about an associated pivot axis $S_1$ or $S_2$, in order to cause in each case a pivoting movement of the levers 5, 6; 5' 6' by means of the actuating movement. In this case, all levers 5, 6; 5', 6' are configured to move synchronously about the first pivot axis $S_1$ when carrying out the actuating movement from the rest position into the depressed position. In order to minimize the horizontal displacement, the pivoting extent of each lever 5, 6; 5', 6' about the first pivot axis $S_1$ is limited according to the disclosed embodiments to 10°, preferably to 5°. Due to the perspective view and the masking resulting therefrom, FIG. 1 does not show the mounting means 11 in their entirety. However, the structure of the second pair is identical to that of the first pair, which becomes clear from the detailed view of the further Figures. The guidance mechanism 4 moreover comprises at least one coupling rod 7, 7' for coupling the pivoting movement of the levers 5, 6; 5', 6'. In this case, the coupling rod 7, 7' is fixed to the levers 5, 6; 5', 6' in an articulated manner, in each case by means of a first flexure joint 16, while defining a joint axis G. In this case, the coupling rod 7, 7' provides a connection between the levers 5, 6; 5', 6' of one pair that can be subjected, if possible exclusively, but at least primarily, to tensile and compressive loads and that serves for transmitting the rotary movement about the first pivot axis $S_1$ from one lever 5, 5' to the respective other lever 6, 6' of the pair, wherein the directions of rotation of the levers 5, 6 or 5', 6' of a pair are in each case opposite in the embodiment shown herein. Due to the fact that the coupling rod 7, 7' and the levers 5, 6; 5', 6' are connected via a first flexure joint 16, the mechanical play of the parallel guidance is minimized. "Lost motion" is avoided. In addition, the parallel guidance can be realized to be free of noise. In order to save constructional space, the first pivot axes $S_1$ of the levers 5, 6; 5', 6' of the guidance mechanism 4, in the rest position of the actuating part 2, are disposed in a common imaginary plane E1, which is inclined to the actuating surface 10, as is most apparent from FIG. 3. As FIG. 2 shows, the first pivot joints 13, 14, with which the levers 5, 6; 5', 6' are rotatably mounted on the support 3, are configured as rotary joints and have a pin 14 each, which reaches into a correspondingly disposed pin accommodating portion 13 of a bearing support formed on the support 3, thus defining the first pivot axes $S_1$. In order to enable the lever 5, 6; 5', 6' to pivot relative to the actuating part 2, the second pivot joint 18 is provided, which in this case is configured as a second flexure joint. Alternatively, the second pivot joint 18 may also be configured as a rotary joint. In the latter embodiment, at least one of the pivot joints of the first pivot joint 13, 14 or the second pivot joint 18 would have to be configured with play in the direction perpendicular to the actuation direction R between the joint partners.

The resetting force, which is primarily generated by an additional resetting means, which is not shown, and which is provided for resetting the actuating part 2 into the rest position, is caused by the elastic deformation of the first flexure joint 16 and, if necessary, the second pivot joints 18 configured as second flexure joints. In order to minimize the mechanical stress on the first flexure joints 16, not only is the pivoting extent of each lever 5, 6; 5', 6' about the first pivot axis $S_1$ limited to 10°, preferably to 5°, but also, the guidance mechanism 4 is designed such that the first flexure joint 16 of each lever 5, 6; 5', 6' is not elastically biased in the rest position, i.e. is in the unstressed position of its non-installed state.

Figure 4:
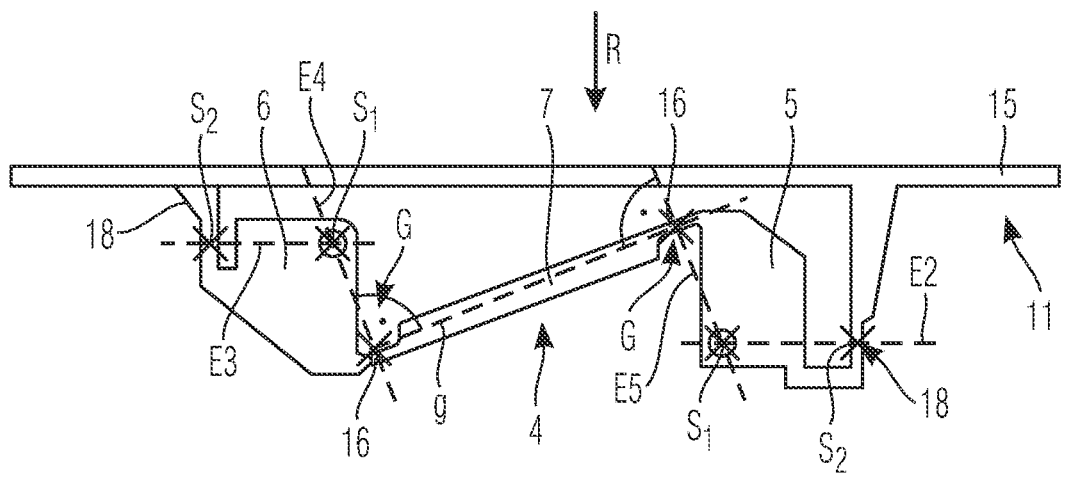
FIG. 4 shows a side view of the mounting means 11, which is shown in FIG. 1 and produced as a molded part.

The pivot axes $S_1$, $S_2$ and the joint axis G of each lever 5, 6; 5', 6' each form an angled lever, wherein the axes are disposed on the corners of an imaginary triangle, as is clear from FIG. 4. The relative distance between the first pivot axis $S_1$ and the second pivot axis $S_2$ of each lever 5, 6; 5', 6' is no more than 1.5 cm, such as 0.5 cm, for example. Moreover, the levers 5, 6; 5', 6' are configured to be identical with respect to the dimension of the relative spacing of the second pivot axis $S_2$ from the first pivot axis $S_1$ and the associated joint axis G from the first pivot axis $S_1$, so as to result in identical lever ratios for each lever 5, 6; 5', 6'. The levers 5, 6; 5', 6' of a pair are coupled to each other, by means of the coupling rod 7, 7', in such a way that their directions of rotation of the pivoting movement in each case about the first pivot axis $S_1$ are opposite. Moreover, the second pivot axes $S_2$ of the levers 5, 6; 5', 6' of the pair, with respect to the first pivot axes $S_1$, are each disposed outwardly offset in the direction perpendicular to the actuation direction R, whereby the tilting of the actuating part 2 is minimized due to the guidance at the outermost location.

In order to subject the coupling rod 7, 7' and the associated first flexure joints 16 substantially, if possible, only to compressive and tensile loads in the rest position, it is provided that in the rest position, a shortest connecting line g connecting the joint axes G, which are respectively defined by the first flexure joint 16, of a pair in each case orthogonally intersects the plane E5 spanned by the first pivot axis $S_1$ of a lever 5 of a pair and the closest joint axis G and the plane E4 spanned by the first pivot axis $S_1$ of the other lever 6 of the same pair and the closest joint axis G. In order to further reduce to a minimum the displacement of the actuating part 2 during the actuation in the horizontal direction, it is further provided that in the rest position, the first pivot axis $S_1$ and the second pivot axis $S_2$ of each lever 5, 6 of the pair lie in mutually parallel planes E2, E3.

As becomes apparent from FIG. 4, the mounting means 11 are configured as a molded part which is manufactured by a thermal molding process in a molding tool. These mounting means 11 comprise a plate-shaped component 15 that serves for attachment to the actuating part 2 on the side thereof facing away from the actuating surface 10, and the guidance mechanism 4 including levers 5, 6; 5', 6', coupling rods 7, 7', the second pivot joint 18, the pin 14 of the first pivot joint 13, 14 as well as the first flexure joints 16, all of which are formed from a thermoplastic material. The flexure joint 16 is in each case the result of a weakening of the material provided in the transitional region between the respective lever 5, 6; 5', 6' and the coupling rod 7, 7', e.g., with respect to the cross section of the respective coupling rod 7, 7', a constricted portion. Due to its location, the weakened-material portion provides for a locally pronounced elastic compliance with resetting properties, and thus a resetting flexibility of the coupling rod 7, 7' in the region of the coupling rod 7, 7' adjacent to the respective lever 5, 6; 5', 6'. This also applies, mutatis mutandis, for the second pivot joints 18 configured as a second flexure joint, which are in each case provided between the component 15 and the associated lever 5, 6; 5', 6'.

What is claimed is:

1. An operating member, comprising:
   a support;
   an actuating part, which defines an actuating surface is mounted on the support by a mount to be movable relative to the support, by manual actuation against a resetting force, along an actuation direction while carrying out an actuating movement from a rest position into a depressed position; and
   a detector having at least one force sensor, wherein the detector is adapted to detect at least one position of the actuating part;
   wherein the mount includes a guidance mechanism having at least one pair of coupled levers, wherein the guidance mechanism is adapted to guide the actuating part in parallel, wherein the levers of the at least one pair of coupled levers are each pivotably mounted on the support by a first pivot joint defining at least one first pivot axis and and also pivotably mounted on the actuating part by a second pivot joint defining at least one second pivot axis, in order to cause in each case a pivoting movement of the levers of the at least one pair of coupled levers by the actuating movement, wherein the guidance mechanism further includes at least one coupling rod in order to couple the pivoting movement of the levers of the at least one pair of coupled levers; wherein the at least one coupling rod is fixed to the levers of the at least one pair of coupled levers in an articulated manner, in each case by a first flexure joint, while defining a joint axis, wherein the levers of the at least one pair of coupled levers are configured for moving synchronously about the first pivot axis when carrying out the actuating movement from the rest position into the depressed position, and a pivoting extent of each lever of the at least one pair of coupled levers about the first pivot axis does not exceed 10°.

2. The operating member according to claim 1, wherein at least one pivot joint among the first pivot joint and the second pivot joint of said each lever of the at least one pair of coupled levers is configured as a second flexure joint.

3. The operating member according to claim 2, wherein the mount has a component which is fixed to the support or the actuating part and which is integrally connected to a respective lever of the at least one pair of coupled levers in each case via the first pivot joint configured as the second flexure joint or the second pivot joint configured as the second flexure joint.

4. The operating member according to claim 2, wherein the first pivot joint of all the levers of the at least one pair of coupled levers is configured as a rotary joint, and the second pivot joint of all the levers of the at least one pair of coupled levers is configured as the second flexure joint.

5. The operating member according to claim 1, wherein the mount includes an integrally formed molded part, which is manufactured in a thermal molding process.

6. The operating member according to claim 1, wherein a relative distance between the first pivot axis and the second pivot axis of each lever of the at least one pair of coupled levers is no more than 1.5 cm.

7. The operating member according to claim 1, wherein, in any one of: the rest position, the depressed position, and an intermediate position, the first pivot axis and the second pivot axis of said each lever of the at least one pair of coupled levers lie in any one of: a common plane and parallel planes (E2, E3).

8. The operating member according to claim 2, wherein at least one of: the first flexure joint and the second flexure joint of said each lever of the at least one pair of coupled levers are configured to generate the resetting force causing a reset into the rest position by an elastic deformation.

9. The operating member according to claim 8, wherein at least in the rest position the first flexure joint of said each lever of the at least one pair of coupled levers is not elastically biased.

10. The operating member according to claim 1, wherein, in the rest position, a shortest connecting line connecting the joint axis of the levers of the at least one pair of coupled levers in each case orthogonally intersects a plane spanned by the first pivot axis of said each lever of the at least one pair of coupled levers and the respectively closest joint axis.

11. The operating member according to claim 1, wherein the levers of the at least one pair of coupled levers are coupled to each other, by the at least one coupling rod, in such a way that directions of rotation of the pivoting movement about the first pivot axis, respectively, is opposite.

12. The operating member according to claim 11, wherein the at least one second pivot axis of the levers of the at least one pair of coupled levers, with respect to the first pivot axis, are each disposed outwardly offset in a direction perpendicular to the actuation direction.

13. The operating member according to claim 1, wherein any one of: the first pivot joint and the second pivot joint has play in a direction perpendicular to the actuation direction.

14. The operating member according to claim 1, wherein the first pivot axis, the second pivot axis, and the joint axis of each lever of the at least one pair of coupled levers respectively form an angled lever.

15. The operating member according to claim 1, wherein the levers of the at least one pair of coupled levers are configured to be identical with respect to a relative spacing of the second pivot axis from the first pivot axis and a relative spacing of the associated joint axis from the first pivot axis.

16. The operating member according to claim 1, wherein two of the levers of the at least one pair of coupled levers are a first pair of levers, wherein the guidance mechanism has a second pair of levers coupled by a second coupling rod.

17. The operating member according to claim 16, wherein at least one lever of the first pair of levers is non-rotatably connected to a lever of the second pair of levers, and/or the coupling rod of the first pair of levers is non-rotatably connected to the second coupling rod of the second pair of levers.

18. The operating member according to claim 1, wherein the actuating part passes through a stroke distance of less than 0.5 cm, during the actuating movement from the rest position into the depressed position.

19. The operating member according to claim 18, wherein a maximum extent of the actuating surface corresponds to at least ten times the stroke distance.

20. The operating member according to claim 1, wherein the actuating part has at least one of: a touchpad and a touchscreen.

21. The operating member according to claim 1, wherein the detector has a capacitively detecting force sensor.

22. The operating member according to claim 1 is used in a motor vehicle.

23. The operating member according to claim 1, wherein the at least one position is the depressed position.

24. The operating member according to claim 1, wherein the pivoting extent of each lever about the first pivot axis does not exceed 5°.

25. The operating member according to claim 1, wherein in the rest position, the first pivot axis and the second pivot axis of said each lever of the at least one pair of coupled levers lie in any one of: a common plane and parallel planes.

26. The operating member according to claim 1, wherein the actuating part passes through a stroke distance of less than 0.3 cm during the actuating movement from rest position into the depressed position.

27. The operating member according to claim 17, wherein the non-rotatable connection is accomplished via a bar.

* * * * *